United States Patent
Woo

(10) Patent No.: US 8,419,198 B2
(45) Date of Patent: Apr. 16, 2013

(54) REAR UNDER VIEW MIRROR SYSTEM FOR VEHICLES

(75) Inventor: Keun-Sang Woo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/204,234

(22) Filed: Aug. 5, 2011

(65) Prior Publication Data

US 2011/0285523 A1    Nov. 24, 2011

Related U.S. Application Data

(62) Division of application No. 11/297,826, filed on Dec. 7, 2005, now abandoned.

(30) Foreign Application Priority Data

Oct. 17, 2005  (KR) .................. 10-2005-0097393

(51) Int. Cl.
  *G02B 7/182*   (2006.01)
  *G02F 1/15*    (2006.01)
  *G02F 1/153*   (2006.01)

(52) U.S. Cl.
  USPC ........... 359/841; 359/872; 359/877; 359/265; 359/267; 359/275

(58) Field of Classification Search .................. 359/245, 359/265, 267, 275, 838, 841, 843, 872, 877
See application file for complete search history.

(56) References Cited

U.S. PATENT DOCUMENTS

| 2,326,357 | A | * | 8/1943 | Horton ........................ 296/95.1 |
| 3,198,070 | A | * | 8/1965 | Platzer, Jr. et al. ............ 359/603 |
| 4,469,405 | A | * | 9/1984 | Wun ............................ 359/841 |
| 4,490,716 | A | * | 12/1984 | Tsuda et al. .................. 340/904 |
| 4,524,356 | A |   | 6/1985 | Kodera et al. |
| 4,551,722 | A |   | 11/1985 | Tsuda et al. |
| 4,832,468 | A | * | 5/1989 | Ito et al. ...................... 359/275 |
| 4,920,520 | A |   | 4/1990 | Gobel et al. |
| 5,337,190 | A | * | 8/1994 | Kogita et al. ................. 359/841 |

(Continued)

FOREIGN PATENT DOCUMENTS

| DE | 4011150 | * | 10/1991 |
| FR | 2543083 | * | 9/1984 |

(Continued)

OTHER PUBLICATIONS

Guenther; Modern Optics; 1990; John Wiley & Sons, Inc.; pp. 73-75.

*Primary Examiner* — Ricky D Shafer

(74) *Attorney, Agent, or Firm* — Edwards Wildman Palmer LLP; Peter F. Corless

(57) ABSTRACT

The present invention provides a rear under view mirror system for vehicles. The rear under view mirror system includes a rear under view mirror unit having a semitransparent glass and an electrically switchable glass. When a vehicle moves forwards, the rear under view mirror unit does not protrude rearwards relative to a vehicle body and overlaps a rear windshield glass, thus providing a good appearance and preventing resistance to airflow, without hindering a driver from seeing the area behind the vehicle through the rear windshield glass. The rear under view mirror unit has a large area corresponding to that of the rear windshield glass, thus providing a sufficient view of the low area to the rear of the vehicle.

6 Claims, 4 Drawing Sheets

U.S. PATENT DOCUMENTS

| | | | |
|---|---|---|---|
| 5,390,045 A * | 2/1995 | Bernard, Jr. | 359/275 |
| 5,497,273 A | 3/1996 | Kogita et al. | |
| 5,537,263 A * | 7/1996 | Kogita et al. | 359/841 |
| 5,712,736 A * | 1/1998 | Kogita et al. | 359/841 |
| 5,724,198 A * | 3/1998 | Nishikawa et al. | 359/841 |
| 6,580,472 B1 * | 6/2003 | Willingham et al. | 349/16 |
| 6,768,574 B2 * | 7/2004 | Bertran Serra et al. | 359/265 |

FOREIGN PATENT DOCUMENTS

| | | | |
|---|---|---|---|
| JP | 01127430 A | | 5/1989 |
| JP | 2000-344014 | * | 12/2000 |
| KR | 2002055064 | | 7/2002 |

* cited by examiner

REAR UNDER VIEW MIRROR SYSTEM FOR VEHICLES

CROSS-REFERENCE TO RELATED APPLICATIONS

The present application is a Divisional of U.S. patent application Ser. No. 11/297,826, filed Dec. 7, 2005, now abandoned, which is based on, and claims priority from, Korean Application Serial Number 10-2005-0097393, filed on Oct. 17, 2005, the disclosures of which applications is are hereby incorporated by reference herein in its their entirety.

FIELD OF THE INVENTION

The present invention relates, in general, to a rear under view mirror system for vehicles and, more particularly, to a rear under view mirror system, intended to allow a driver to sufficiently see low areas to the rear of a vehicle, without hindering a driver's sight at normal times.

BACKGROUND OF THE INVENTION

A rear under view mirror is used for SUVs, buses, etc. to allow a driver to distinguish obstacles which are located at low positions to the rear of a vehicle body. Generally, the rear under view mirror is provided on the outer portion of a rear windshield glass in such a way as to protrude rearwards.

As such, the rear under view mirror is secured to the vehicle body in such a way as to protrude rearwards. Thus, the rear under view mirror is problematic in that it has resistance to airflow, creates a poor appearance, and hides part of the rear windshield glass, thus hindering a driver from seeing the rear of a vehicle. Further, the mirror is small, so that the driver cannot sufficiently see low positions to the rear of the vehicle.

SUMMARY OF THE INVENTION

Embodiments of the present invention provide a rear under view mirror system for vehicles, which is constructed so that the system does not protrude rearwards from a vehicle when the vehicle moves forwards, and allows a driver to sufficiently see low positions to the rear of the vehicle, without hiding a rear windshield glass.

A rear under view mirror system for vehicles according to an embodiment of the present invention includes a rear under view mirror means which is mounted to an outer portion of a rear windshield glass in such a way as to be converted between a state where the rear under view mirror means overlaps the rear windshield glass, and a state where the rear under view mirror means is rotated upwards relative to the rear windshield glass. The rear under view mirror means passes light from an area behind a vehicle to an occupant when overlapping the rear windshield glass, and reflects a view of a low area to the rear of the vehicle to the occupant when rotated upwards. A rotation means functions to rotate the rear under view mirror means. Further, a controller functions to control the rotation means.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, the preferred embodiment of the present invention will be described with reference to the accompanying drawings.

Referring to FIGS. 1 to 4, a rear under view mirror system of the present invention includes a rear under view mirror means, a rotation means 3, and a controller 5. The rear under view mirror means is installed to be converted between a state where it is provided on the outer portion of a rear windshield glass 1 to overlap the rear windshield glass 1, and a state where it is rotated upwards relative to the rear windshield glass 1. When the rear under view mirror means overlaps the rear windshield glass 1, light passes from the rear portion of a vehicle to an occupant. Meanwhile, when the rear under view mirror means is rotated upwards, an image of a low area to the rear of the vehicle is reflected to the occupant. The rotation means 3 functions to rotate the rear under view mirror means. The controller 5 controls the rotation means 3.

The rear under view mirror means may comprise transparent glass to pass light or semitransparent glass to reflect light, depending on the incident angle of light.

That is, when the semitransparent glass overlaps the rear windshield glass 1, light is transmitted from the rear portion of the vehicle to an occupant. Conversely, when the semitransparent glass is rotated upwards, an image of the low area to the rear of the vehicle is reflected.

Preferably, the semitransparent glass is formed to have the same size as that of the rear windshield glass 1. In a usual driving state where the semitransparent glass overlaps the rear windshield glass 1, the semitransparent glass may not be distinguished from outside the vehicle but appears to be the rear windshield glass 1, thus providing a neat appearance to the rear portion of the vehicle.

Further, when the semitransparent glass is formed in this way, it allows an occupant to sufficiently see the low area to the rear of the vehicle.

Figure 1:
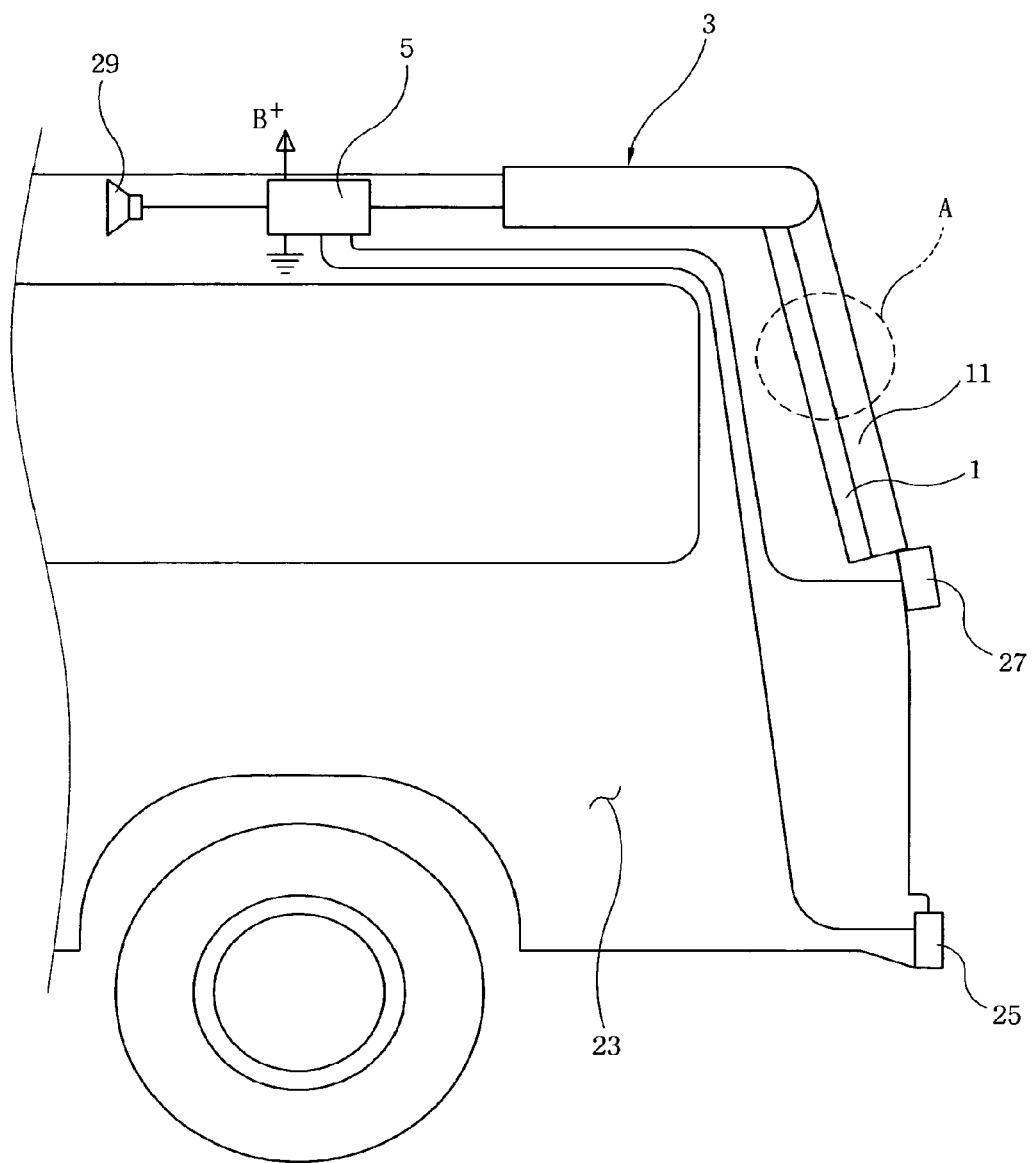
FIG. 1 illustrates a rear under view mirror system for vehicles, according to the present invention.
Figure 2:
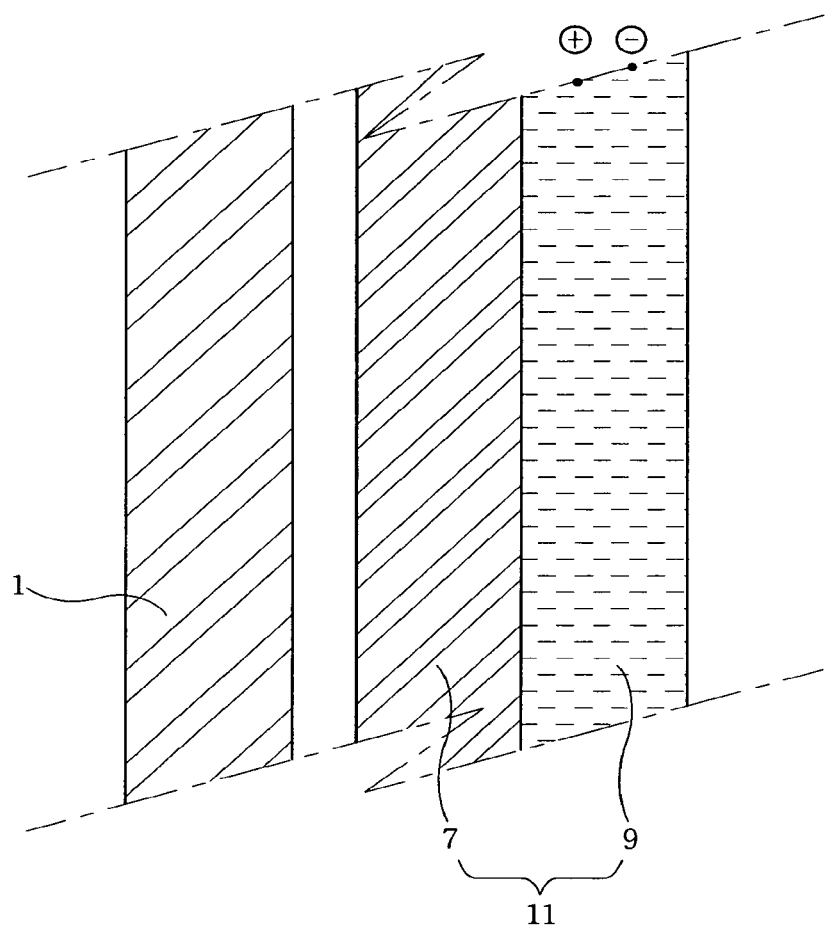
FIG. 2 is a detailed view of the encircled portion marked A in FIG. 1.

According to the embodiment, as shown in FIG. 2, the rear under view mirror means comprises a rear under view mirror unit 11 having a semitransparent glass 7 and an electrically switchable glass 9. The semitransparent glass 7 transmits or reflects light depending on the incident angle of light. The electrically switchable glass 9 integrally overlaps the outer portion of the semitransparent glass 7, and is converted into a transparent state or an opaque state, depending on whether electricity is supplied by the controller 5.

As such, the rear under view mirror unit 11 manufactured by attaching the electrically switchable glass 9 to the semitransparent glass 7 functions to more reliably secure the reflecting action of the semitransparent glass 7.

That is, when the rear under view mirror unit 11 overlaps the rear windshield glass 1, electricity is not supplied to the electrically switchable glass 9, so that the electrically switchable glass 9 maintains a transparent state, thus enabling a driver to see the area behind the vehicle. Meanwhile, when the rear under view mirror unit 11 is rotated upwards and is positioned at an angle, so that the semitransparent glass 7 reflects the view of the low area to the rear of the vehicle, electricity is supplied to the electrically switchable glass 9. Thereby, the electrically switchable glass 9 blocks light transmitted from the exterior of the vehicle through the semitransparent glass 7, so that the semitransparent glass 7 allows light transmitted from the low area to the rear of the vehicle to be more efficiently reflected to an occupant.

Conversely, the electrically switchable glass 9 may be operated such that it maintains an opaque state when electricity is not supplied to the electrically switchable glass 9, and becomes transparent when electricity is supplied to the electrically switchable glass 9. Of course, when such an electrically switchable glass is used, the present invention is constructed so that the supply of electricity is performed by a controller oppositely to the above-mentioned case.

Preferably, the rear under view mirror unit 11 has the same size as that of the rear windshield glass 1, thus providing a neat appearance to the rear portion of the vehicle, and allowing an occupant to sufficiently see the low area to the rear of the vehicle.

Figure 3:
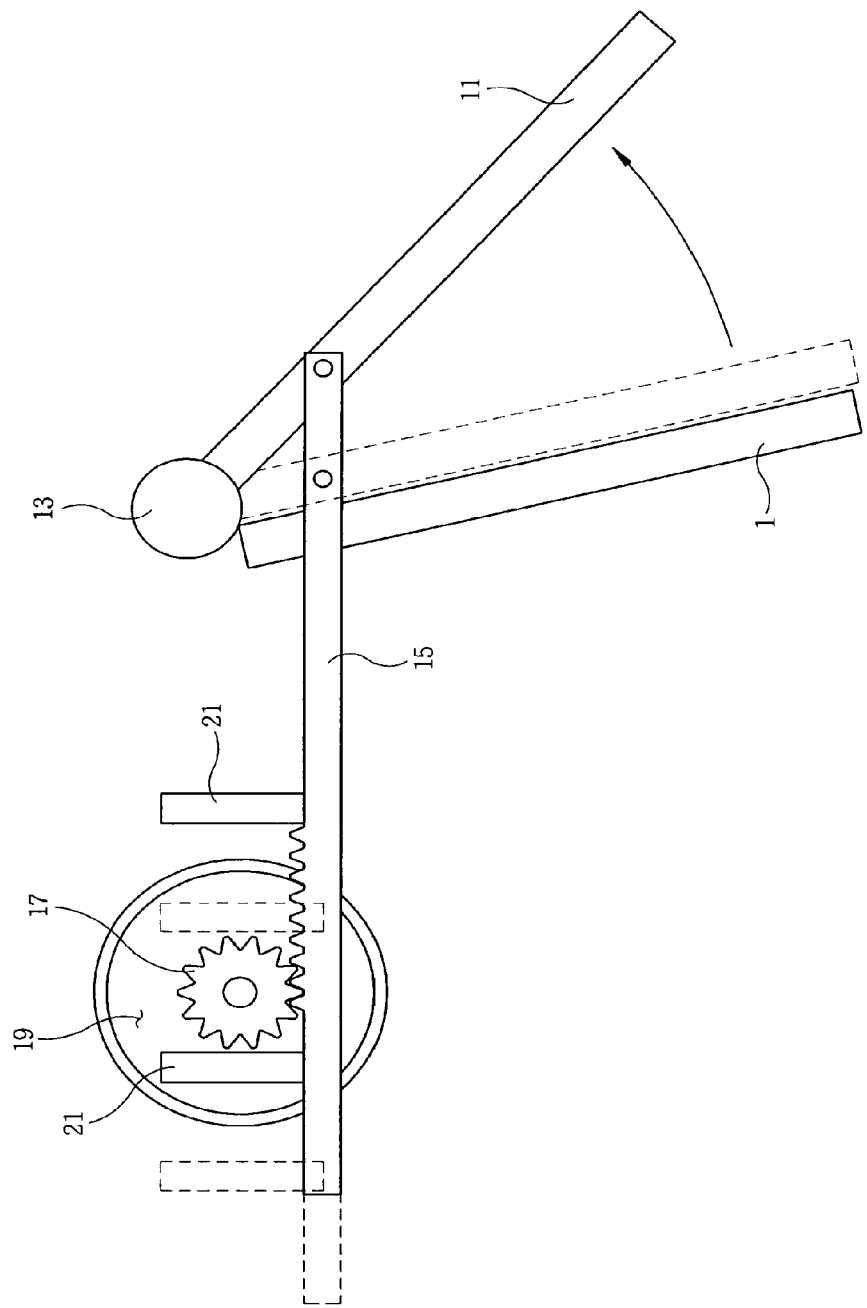
FIG. 3 depicts an embodiment of a mirror drive unit.
Figure 4:
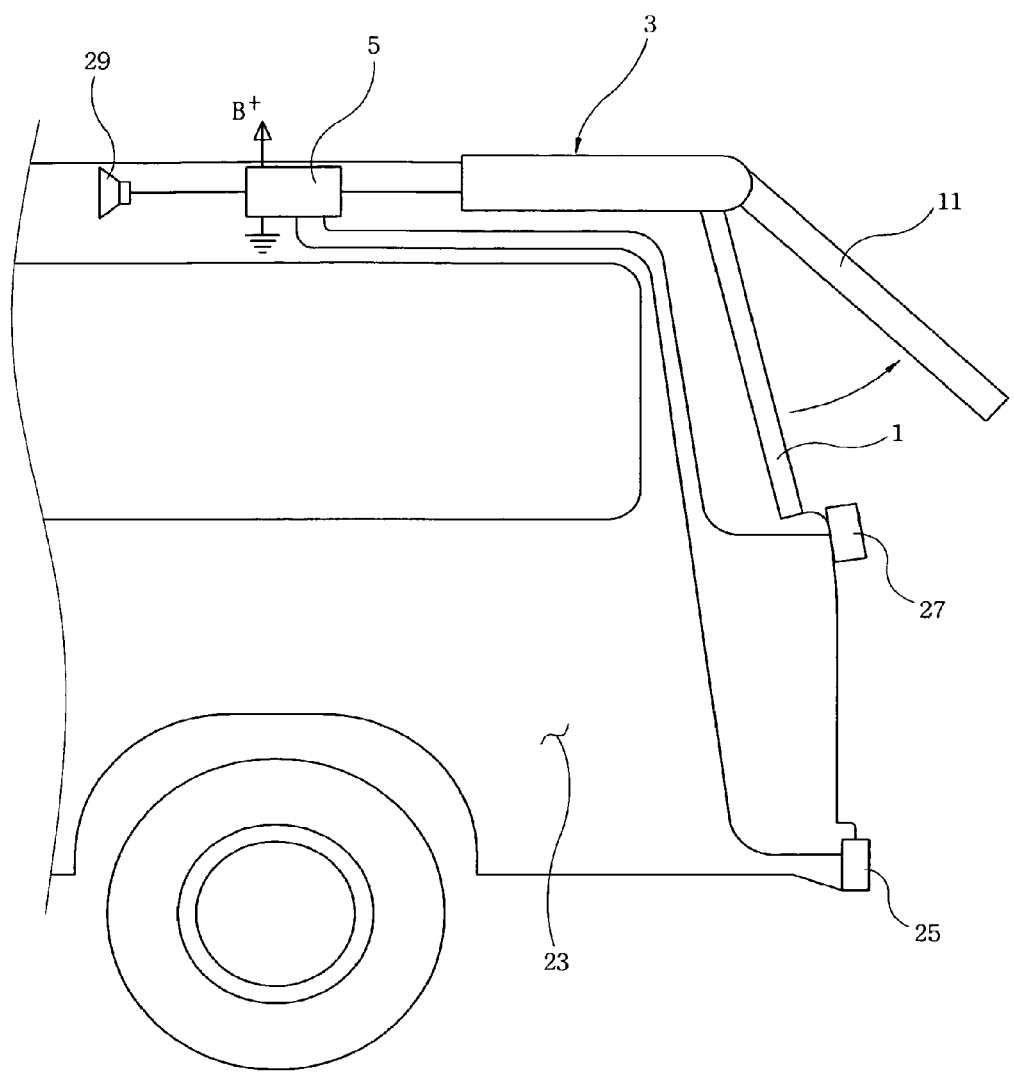
FIG. 4 illustrates the operation of the rear under view mirror system, for comparison with FIG. 1.

In the embodiment, as shown in FIG. 3, the rotation means 3 includes a rotating shaft 13, a rack rod 15, and a motor 19. The rotating shaft 13 holds the upper end of the rear under view mirror unit 11 to the vehicle body. The rack rod 15 is rotatably coupled to the rear under view mirror unit 11. The motor 19 is provided with a pinion 17 that engages with the rack rod 15.

Stoppers 21 are provided at predetermined positions on the rack rod 15 to limit the range of movement of the rack rod 15 relative to the pinion 17.

Thus, when the controller 5 drives the motor 19, the pinion 17 rectilinearly moves the rack rod 15, thus rotating the rear under view mirror unit 11. The stoppers 21 function to mechanically limit excessive rotation of the rear under view mirror unit 11.

A rear sensor 25 is installed in the vehicle body 23 to detect whether or not an obstacle exists behind the vehicle. Further, a damage preventing sensor 27 is provided on the vehicle body at a position adjacent to the lower end of the rear under view mirror unit 11.

The controller 5 indicates whether the motor 19 is coupled to the rear sensor 25 and the damage preventing sensor 27, an alarm means 29 is coupled to a speed sensor, and the driver selects a reverse gear.

The rear sensor 25 or the damage preventing sensor 27 may comprise an ultrasonic sensor. The alarm means 29 may comprise a buzzer or the like.

An example where the controller 5 automatically drives the rear under view mirror unit 11 will be described below.

In order to confirm whether it is necessary to ensure vision of the low area to the rear of the vehicle body, the controller 5 confirms that the reverse gear is selected.

When the reverse gear is selected, the speed sensor determines whether the speed of the vehicle is 20 km/h or less, and the rear sensor 25 determines whether an obstacle is present within 1 m behind the vehicle body.

Further, when the rear under view mirror unit 11 rotates upwards and rearwards relative to the vehicle body, the damage preventing sensor 27 detects whether an obstacle is present within the maximum protruding distance of the lower end of the rear under view mirror unit 11, which protrudes rearwards. Assuming that an obstacle exists within the preset maximum protruding distance, the alarm means 29 indicates to a driver that the obstacle exists.

When the vehicle speed and the obstacle satisfy the predetermined conditions, and there is no possibility of the damage to the rear under view mirror unit 11, the controller 5 drives the motor 19 so that the rear under view mirror unit 11 rotates rearwards and upwards relative to the vehicle body. Thereby, the semitransparent glass 7 provides a view of the low area to the rear of the vehicle body to an occupant.

At this time, electricity is supplied to the electrically switchable glass 9, so that the reflecting action of the semitransparent glass 7 is improved.

When the reverse gear is disengaged, the controller 5 drives the motor 19 in a reverse direction. Thus, the rear under view mirror unit 11 overlaps the surface of the rear windshield glass 1, and electricity supplied to the electrically switchable glass 9 is cut off, so that the electrically switchable glass 9 becomes transparent.

As apparent from the foregoing, the present invention provides a rear under view mirror unit having a semitransparent glass and an electrically switchable glass.

When a vehicle moves forwards, the rear under view mirror unit does not protrude rearwards relative to a vehicle body and overlaps a rear windshield glass, thus providing a good appearance and preventing resistance to airflow, without hindering a driver from seeing the area behind the vehicle through the rear windshield glass. The rear under view mirror unit has a large area corresponding to that of the rear windshield glass, thus providing a sufficient view of the low area to the rear of the vehicle.

What is claimed is:

1. A rear under view mirror system for vehicles, comprising:
   rear under view mirror means mounted to an outer portion of a rear windshield glass in such a way as to be converted between a state where the rear under view mirror means overlaps the rear windshield glass, and a state where the rear under view mirror means is rotated upwards relative to the rear windshield glass, the rear under view mirror means passing light from an area behind a vehicle to an occupant when overlapping the rear windshield glass, and reflecting a view of a low area to the rear of the vehicle to the occupant when rotated upwards;
   rotation means to rotate the rear under view mirror means; and
   a controller to control the rotation means,
   wherein said rear under view mirror means comprises a rear under view mirror unit including:
   a semitransparent glass passing or reflecting light depending on an incident angle of light; and
   an electrically switchable glass integrally overlapping an outer portion of the semitransparent glass, and converted between a transparent state and an opaque state, depending on whether electricity is supplied by the controller.

2. The rear under view mirror system as defined in claim 1, wherein said semitransparent glass has the same size as the rear windshield glass.

3. The rear under view mirror system as defined in claim 1, wherein the rear under view mirror unit has the same size as the rear windshield glass.

4. The rear under view mirror system as defined in claim 3, wherein said rotation means comprises:
   a rotating shaft to secure an upper end of the rear under view mirror unit to a vehicle body;
   a rack rod rotatably connected to the rear under view mirror unit; and
   a motor having a pinion that engages with the rack rod.

5. The rear under view mirror system as defined in claim 4, further comprising:
   a stopper provided at a predetermined position on the rack rod, and limiting a range of movement of the rack rod relative to the pinion.

6. The rear under view mirror system as defined in claim 3, further comprising:
- a rear sensor mounted to a rear portion of a vehicle body, and providing data to the controller;
- a damage preventing sensor installed at a position adjacent to a lower end of the rear under view mirror unit on the rear portion of the vehicle body, and providing data to the controller; and
- alarm means connected to the controller.

\* \* \* \* \*